United States Patent
Telford

[11] Patent Number: 5,948,459
[45] Date of Patent: Sep. 7, 1999

[54] CONTINUOUS CHEESE MOLDING, CHILLING AND CUTTING APPARATUS AND METHOD

[76] Inventor: Randy Telford, 1804 E. Carriage Park Cir., Salt Lake City, Utah 84121

[21] Appl. No.: 08/919,556

[22] Filed: Aug. 29, 1997

Related U.S. Application Data

[60] Provisional application No. 60/024,947, Aug. 30, 1996.

[51] Int. Cl.[6] ............................... A23C 19/00; A23P 1/00
[52] U.S. Cl. .......................... 426/512; 99/455; 165/143; 264/327; 425/378.1; 425/379.1; 426/524; 426/582
[58] Field of Search ................................ 426/512, 524, 426/582; 425/308, 378.1, 379.1; 264/145, 148, 327; 99/452, 455, 470; 62/340, 356; 165/143

[56] References Cited

U.S. PATENT DOCUMENTS

| | | | |
|---|---|---|---|
| 3,020,163 | 2/1962 | Stine | 426/524 |
| 3,765,090 | 10/1973 | Roberts et al. | 426/38 |
| 3,859,905 | 1/1975 | Roberts et al. | 99/455 |
| 4,206,238 | 6/1980 | Rothenbuhler | 99/452 |
| 4,680,181 | 7/1987 | Leavitt et al. | 426/582 |
| 4,738,302 | 4/1988 | Abma | 99/455 |
| 4,820,540 | 4/1989 | Budahn | 426/582 |
| 4,848,219 | 7/1989 | Aldrovandi | 99/452 |
| 4,898,745 | 2/1990 | Zamzow et al. | 426/582 |
| 4,902,523 | 2/1990 | Fritchen et al. | 426/582 |
| 4,976,981 | 12/1990 | Skovhage et al. | 426/582 |
| 5,032,417 | 7/1991 | Jay | 426/582 |
| 5,104,675 | 4/1992 | Callahan et al. | 426/582 |
| 5,200,216 | 4/1993 | Barz et al. | 426/582 |
| 5,218,898 | 6/1993 | Norris | 99/455 |
| 5,240,724 | 8/1993 | Otto et al. | 426/582 |
| 5,330,780 | 7/1994 | Yee et al. | 426/582 |
| 5,334,398 | 8/1994 | Sueyasu et al. | 426/38 |
| 5,429,829 | 7/1995 | Ernster, Sr. | 426/582 |

*Primary Examiner*—George Yeung
*Attorney, Agent, or Firm*—Morriss, Bateman, O'Bryant & Compagni

[57] ABSTRACT

The method and apparatus for continually molding, chilling and cutting cheese of the present invention utilizes an elongate molding tube having an inlet end and an outlet end, and a pump/movement mechanism for forcing cheese curd into the inlet end of the elongate molding tube. A cooling mechanism is disposed in communication with the elongate molding tube to chill the molding tube and thereby chill the cheese as it passes through the molding tube so that cheese passing out of the outlet end of the elongate molding tube may be cut to the desired size and packaged, aged, etc. The cooling mechanism forms a cooling gradient within the molding tube, such that warmer temperature coolant is used about the inlet end of the molding tube than about the outlet end. The cooling gradient is applied in such a manner to provide a more uniform cooling in the cheese, and thereby achieve a superior end product.

28 Claims, 6 Drawing Sheets

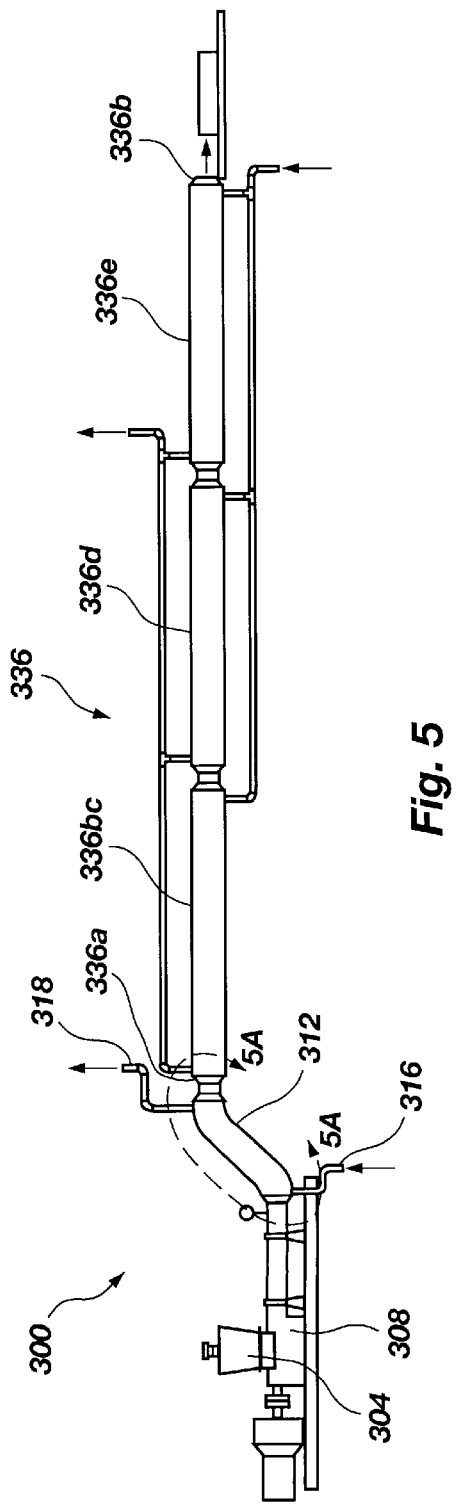
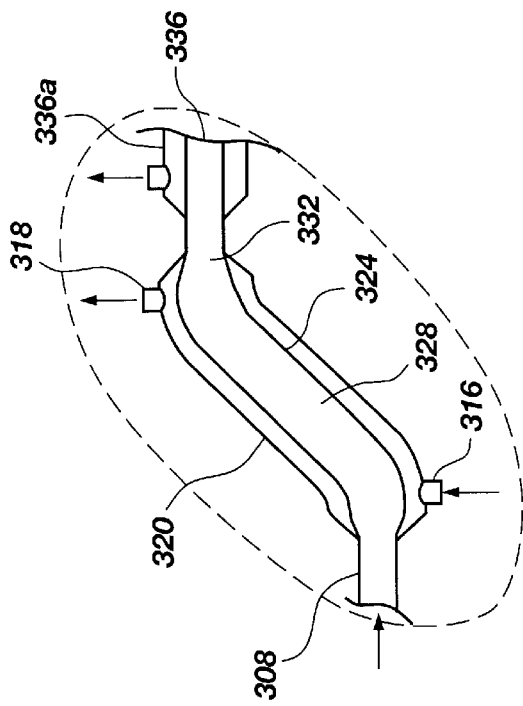
Fig. 5
Fig. 5A

CONTINUOUS CHEESE MOLDING, CHILLING AND CUTTING APPARATUS AND METHOD

RELATED APPLICATIONS

This application claims the benefit of U.S. Provisional Patent Application Serial No. 60/024,947, filed Aug. 30, 1996.

BACKGROUND OF THE INVENTION

1. Field of the Invention

The present invention relates to an apparatus and method for making cheese. More particularly, the present invention relates to a method and apparatus for molding and chilling the cheese so as to enable automated delivery of a desired sized piece of cheese, at a desired temperature.

2. State of the Art

The making of cheese is generally a labor intensive process that requires large quantities of milk, and substantial man hours to develop any of the many popular varieties. In order to make cheese, a large volume of milk is typically processed to remove the cream. The skimmed milk is then pasteurized and forwarded to a large vat. The milk in the vat is then heated and a bacterial culture is added to the heated milk to cause acid production. A setting or curdling agent, such as rennet, is also mixed in to cause the milk product to set. Depending on what type of cheese is being made, a coloring agent may also be added to the mixture.

After the milk sets sufficiently, the jelly like mass is cut into ribbons or small cubes. The cutting allows the cheese curds to separate from the liquid whey. The solids fall to the bottom and the whey is drawn off.

The cheese curds may be further processed to remove excess whey if necessary. The cheese is then allowed to reach the correct level of acidity and is salted.

To form the cheese into the form typically seen by consumers, the ribbons or cubes of cheese curds are then dispensed into large metal containers or hoops. Typically each hoop will hold approximately 40 pounds of cheese. Up to this point, the cheese curds remain warm and soft.

Once the hoop has been filled, it is lifted into a press which holds the contents of the hoop under pressure. The press is then moved into a large refrigeration unit. As the cheese curds are cooled under pressure, they form a forty pound block of cheese. Typically, the cheese curds will be cooled and left under pressure in the hoop overnight. The following day, the forty pound block of cheese is withdrawn from the hoop and cut into five pound blocks. Depending on the type of cheese being made, the five pound blocks may either be cured/aged for an extended period of time, or may be forwarded for further processing.

The process discussed above is very labor intensive, as each hoop filled with forty pounds of cheese is typically placed in the press by hand. Such a system raises several concerns. For example, there are a large number of injuries, as the combination of heavy containers of cheese and a floor having butter fat spilled thereon leads to numerous accidents. While there have been numerous attempts to automate the process, these attempts have generally met with less than satisfactory results.

In addition to the problems discussed above which relate to most types of cheese, the making of mozzarella cheese raises additional concerns. Specifically, the mozzarella cheese must typically be cooled before placement in the hoops to ensure that it will set properly and not cling to the hoops. Before being placed in the hoops, the soft mozzarella cheese curds are passed through a brine solution bath. The brine solution cools the outer layer of the cheese sufficiently that it can be packed in the hoops and pressed in the conventional manner.

Unfortunately, large amounts of brine are used and the brine solution must be frequently disposed of to ensure sanitary conditions. The large amount of brine raises serious environmental concerns. First, the brine solution itself is a potential contaminant and improper disposal can lead to contaminated groundwater supplies. Second, the brine solution contains high levels of nonvolatile solids, and must be treated with caustic and acidic materials to try to neutralize the solution prior to dumping.

Even after the brine solution has been treated, special care must be exercised to ensure that the solution is disposed of properly. While in the past the solution has merely been dumped, new environmental laws prohibit such disposal, and mozzarella producers are often fined or otherwise charged when the pH is unacceptable or the nonvolatile solid content is too high.

Currently, the environmentally ideal way to dispose of the brine solution is to dry the solution to achieve a powder-like substance. The substance, however, must still be disposed of, as it is not food grade due to the contaminants from the cheese. Thus, it must be buried in a land fill or otherwise disposed of so as not to contaminate ground water supplies.

Thus, there is a significant need for an apparatus and method for continuous molding, chilling and cutting of cheese. Such a system should be easy to use and should lessen the environmental harms typically involved with making cheese. Such a system should also decrease the costs to producers and lessen the risks to workers associated with making cheese.

SUMMARY OF THE INVENTION

It is an object of the present invention to provide an improved apparatus and method for processing cheese which enables the continuous and automated molding, chilling and cutting while minimizing the cost and loss thereof.

It is another object of the present invention to provide such an apparatus and method which enables the molding of cheese into different desired shapes and sizes.

It is another object of the present invention to enable the production of mozzarella and other similar cheeses without exposing the cheese to a brine solution to cool the cheese.

It is yet another object of the present invention to provide such an apparatus which may be conveniently cleaned in place so as to minimize downtime during the production of cheese.

It is still another object of the present invention to provide such an apparatus and method which provides a cheese of a desired size and temperature as the cheese is released from the apparatus, rather than requiring subsequent cooling and cuttings.

It is still yet another object of the present invention to provide such an apparatus and method which may be tailored to different types of cheeses so that a single machine can be used to make both hard and soft cheeses.

The above and other objects of the invention not specifically enumerated are realized in specific illustrated embodiments of a method and apparatus for continually molding, chilling and cutting cheese including an elongate molding tube having an inlet end and an outlet end, and a pump mechanism for forcing cheese curd into the inlet end of the elongate molding tube. A cooling mechanism is disposed in communication with the elongate molding tube to chill the molding tube and thereby chill the cheese as it passes through the molding tube so that cheese passing out of the outlet end of the elongate molding tube may be cut to the desired size and packaged, aged, etc.

In accordance with one aspect of the present invention, the cooling mechanism disposed in communication with the elongate molding tube forms a cooling gradient within the molding tube, such that warmer temperature coolant is used about the inlet end of the molding tube than about the outlet end. In one embodiment, the gradient is configured to provide a continual drop in temperature of the coolant from the inlet end of the molding tube to the outlet end of the molding tube, thereby allowing the cheese to gradually cool as it moves through the molding tube. As the cheese is moved through the elongate molding tube, it is simultaneously cooled and molded into a block. A cutting mechanism disposed at the end of the outlet tube can cut the cheese at a desired length, thereby providing a block of cheese of the desired weight.

In accordance with another aspect of the invention, a sensor may be provided to enable automatic cutting of the cheese when a desired size piece of cheese has been obtained, thereby minimizing the handling of the cheese by those working at the factory.

In accordance with another aspect of the present invention, a plurality of sensors may be disposed along the molding tube to ensure that the cheese is cooling at a rate which will promote proper formation of the blocks of cheese without over solidification about the exterior of the cheese. If the cheese is cooled improperly, the machine "freezes" the molding tube. In other words, the outer portion of the cheese becomes sufficiently chilled that it will no longer slide through the molding tube. The cheese, however, is not suitable for further processing because the inside of the cheese is not solidified properly. By gradually bringing the temperature down, the entire block of cheese is able to cool to the desired temperature by its arrival at the outlet end of the molding tube without freezing the molding tube. The cheese has an improved consistency, and is ready for aging or packaging without further processing.

In accordance with another aspect of the invention, the cheese is heated prior to cooling. Preferably, the cheese to heated to a sufficiently high temperature to prevent mechanical separation of the cheese curds in the resulting product.

In accordance with another aspect of the invention, an expansion chamber is disposed between the pump and the molding tube. The expansion chamber enables the escape of any air which might cause mechanical separation in the cheese as it is being formed into blocks. To ensure that the air is properly vacated, a vacuum mechanism can be disposed in communication with the expansion chamber.

In accordance with still another aspect of the invention, the molding tube may have numerous different cross-sectional shapes to thereby enable the producer to provide cheese of a desired shape. Thus, for example, the molding tube could be configured to produce blocks of cheese which are formed in the shape of a star, a circle, a rectangle, etc. Shapes other rectangles and circles have typically been formed by obtaining a larger block of cheese and cutting the desired shape therefrom. Such results in large amounts of left over cheese that must be reprocessed and/or used for some other purpose.

In contrast, the present invention utilizes the shape of the molding tube to provide the desired shape of the end product. By closely controlling the cooling gradient, the operator can ensure that the cheese solidifies properly despite the thermal properties inherent in the shape.

Preferably, the molding tubes may be interchanged so that the producer may produce the desired cheese shape and then change the apparatus to produce a different cheese shape. In such a manner, even small cheese makers can offer a wide variety of shapes and sizes without the need of purchasing numerous different cheese molding/chilling/cutting apparatuses. Additionally, such an apparatus reduces the need for the small cheese maker to have a large number of employees who can stack forty pound hoops filled with cheese curds, as the cheese which exits the apparatus is ready for aging and/or packaging.

BRIEF DESCRIPTION OF THE DRAWINGS

The above and other objects, features and advantages of the invention will become apparent from a consideration of the following detailed description presented in connection with the accompanying drawings in which:

FIG. 5 shows a side view of an alternate embodiment of the present invention;

FIG. 5A shows a close-up view of the pre-heat vessel and back pressure device shown in FIG. 5.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1:
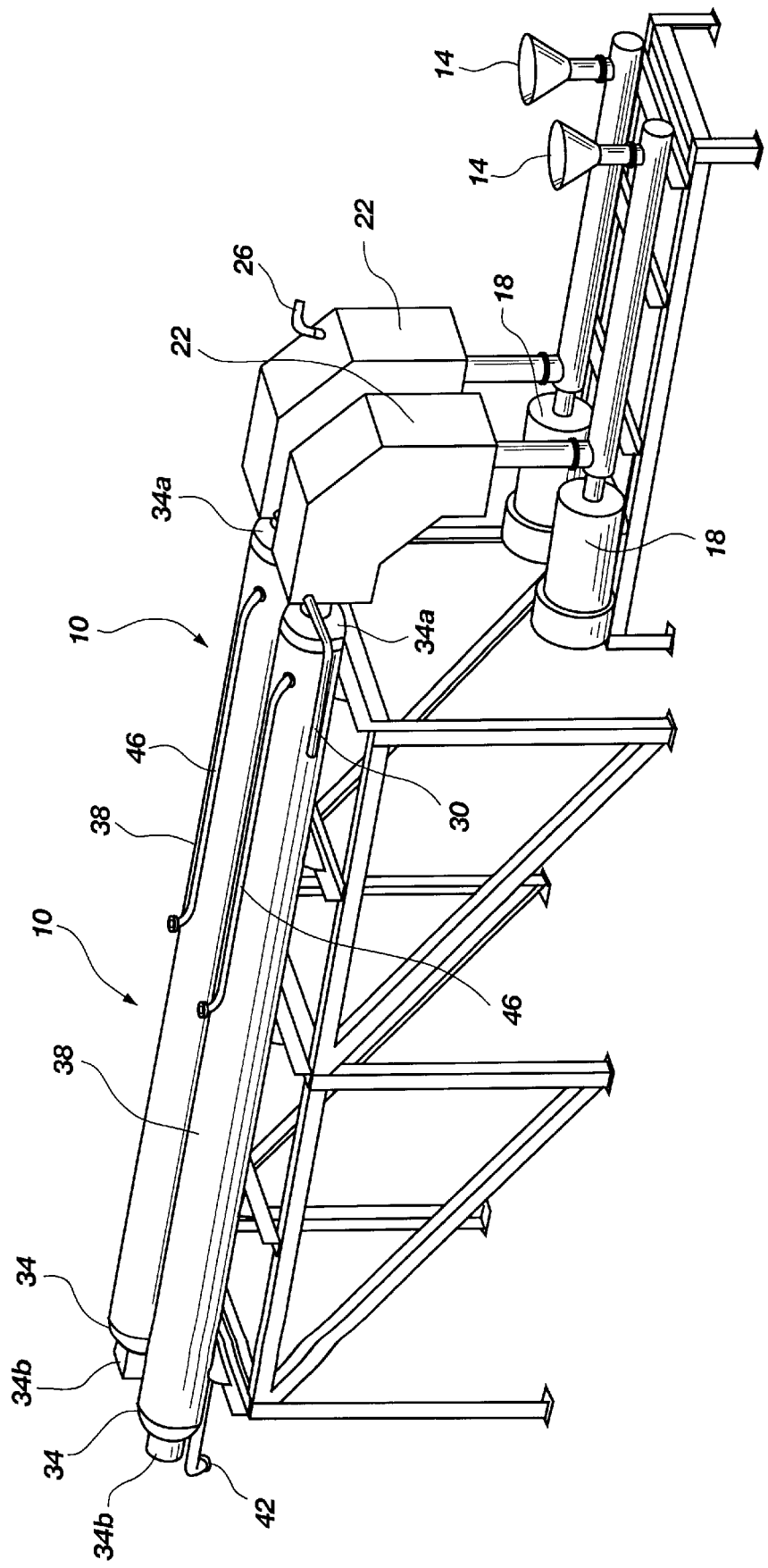
FIG. 1 shows a perspective view of one embodiment of a continuous cheese molding, chilling and cutting apparatus of the present invention, with the cutting element omitted.

Referring to FIG. 1, there is shown a perspective view of two continuous cheese molding, chilling and cutting apparatuses, each generally indicated at 10, positioned side by side. Each apparatus 10 includes an inlet 14. As shown in FIG. 1, the inlet 14 will typically be funnel shaped, although other configurations may be used. The inlet 14 receives hot cheese from an extruder or other analogous structure of a conventional cheese making system.

From the inlet 14, the warm cheese curds are passed through a pump 18. The pump 18 must have sufficient drive to forcibly move the cheese, as the pump forms the primary movement mechanism throughout the apparatus 10. Those skilled in the food processing arts will appreciate that a MYONO product pump is suitable for such a purpose. Furthermore, it has been found that pumps produced by Marlen Research Corp., of Kansas City, Mo. work especially well for pumping the cheese through the apparatus 10.

From the pump 18, the cheese curds are typically passed through an expansion chamber (the housing of which is shown at 22), in order to remove any excess air which might cause mechanical separation of the cheese curds as they are formed into the blocks of cheese. If desired, a vacuum 26 may be provided to ensure that any excess air is drawn off.

To further facilitate the relatively rapid handling of the cheese, the expansion chamber may be cooled to help lower the temperature of the warm cheese as it is moved through the expansion chamber by the pump 18. If the expansion chamber is cooled, a coolant supply line 30 will typically be disposed in communication with the expansion chamber housing 22 so as to circulate a cooling medium within the housing and thereby cool the contents of the expansion chamber.

From the expansion chamber, the cheese is forced into an inlet end 34a of an elongate molding tube 34. As shown FIG. 1, only the inlet ends 34a and the outlet ends 34b of each of the molding tubes 34 are visible due to a sleeve or jacket tube 38 which is disposed about each molding tube. The jacket tube 38 disposed about each molding tube 34 is connected to a coolant supply line 42 and a coolant return line 46. The coolant supply lines 42 and the coolant return lines 46 are typically disposed on opposite ends of the jacket tube 38 because the flow of coolant within the jacket tube should preferably be configured to create a cooling gradient or cooling differential between opposing ends of the molding tube 34. Thus, the inflow of the cold coolant will typically be adjacent the outlet end 34b of the molding tube 34 so that the molding tube is chilled to the coolest temperature adjacent the outlet end. The warmest coolant, i.e. that which is about to flow out of the outflow line 46, is disposed about the inlet end 34a of the molding tube 34. In such a location, the warmest coolant is disposed about the portion of the molding tube 34 containing the warmest cheese.

If a single jacket tube 38 is provided, coolant flowing into the coolant supply line 42 will maintain the outlet end 34b of the molding tube 34 at a much cooler temperature than adjacent the inlet end 34a. As the coolant moves to the coolant return line 46, a continual heat exchange takes place between the coolant and the cheese within the molding tube 34. While attempts have been made to cool cheese within a tube, the process was eventually abandoned because the cheese would freeze up. In other words, the outermost portion of the cheese would solidify must faster than the inner portions. The solidified cheese inhibits sliding within the elongate tube and must be extracted from the tube. Because of such problems, prior attempts to mold and chill the cheese as it moves through an elongate tube have generally been abandoned.

By providing a cooling gradient along the molding tube 34, the present invention facilitates the gradual and generally uniform cooling of the cheese. The cheese moves well through the molding tube 34 because of its generally uniform state of solidification. By the time the cheese arrives at the outlet end 34 of the molding tube 34, the cheese has achieved a desired temperature for cutting throughout the block of cheese—not just the exterior. Exactly what temperature is desired depends on the type of cheese. For example, if cheddar cheese is being molded and chilled, the coolant mechanism will be run so as to gradually bring the temperature down to about 70 degrees F. If soft cheeses, such as mozzarella are being formed, a final temperature of 40 to 50 degrees F is more desirable.

The length of the molding tube 34 will depend on the type of cheese and the size of the desired output. For example, five pound blocks are typically cut from the 40 pound blocks produced by the conventional hoop. The five pound blocks may be sold at that size, or cut into one pound blocks, as are commonly sold in supermarkets. Rather than requiring additional processing of 40 pound blocks, the molding tube 34 can be configured to form five pound blocks with each cut. If desired, single pound blocks also can be provided.

The apparatus shown in FIG. 1 will not eliminate the use of 40 pound blocks of cheese, however. The surplus cheese purchase program of the United States federal government purchases 40 pound blocks of cheese. Thus, those desiring to sell to the government must have the capability of producing a 40 pound block. To achieve a 40 pound block, the molding tube 34 must simply be made with a large inner circumference. However, to achieve proper molding and chilling of a block of cheese having a much larger cross-sectional area, the molding tube 34 must be several times as long because the insulative dynamics of the cheese places limitations on thermal conductivity. The greater the cross-sectional area, the greater the length of time the cheese will need to solidify in a generally uniform manner.

Also shown in FIG. 1 is that the molding tube can be any of a number of different shapes in cross-section. The closer molding tube is round, while the molding tube adjacent thereto is square. Because of the unique control of cooling which is supplied by the present invention, the cheese can be "extruded" in the different shapes, the cooling system being adjusted to compensate for changes in cooling dynamics resulting from the cross-sectional shape of the molding tube. Such an arrangement allows unique shapes to be formed without wasting cheese or requiring reprocessing of leftover cheese cut from a larger block.

Figure 2:
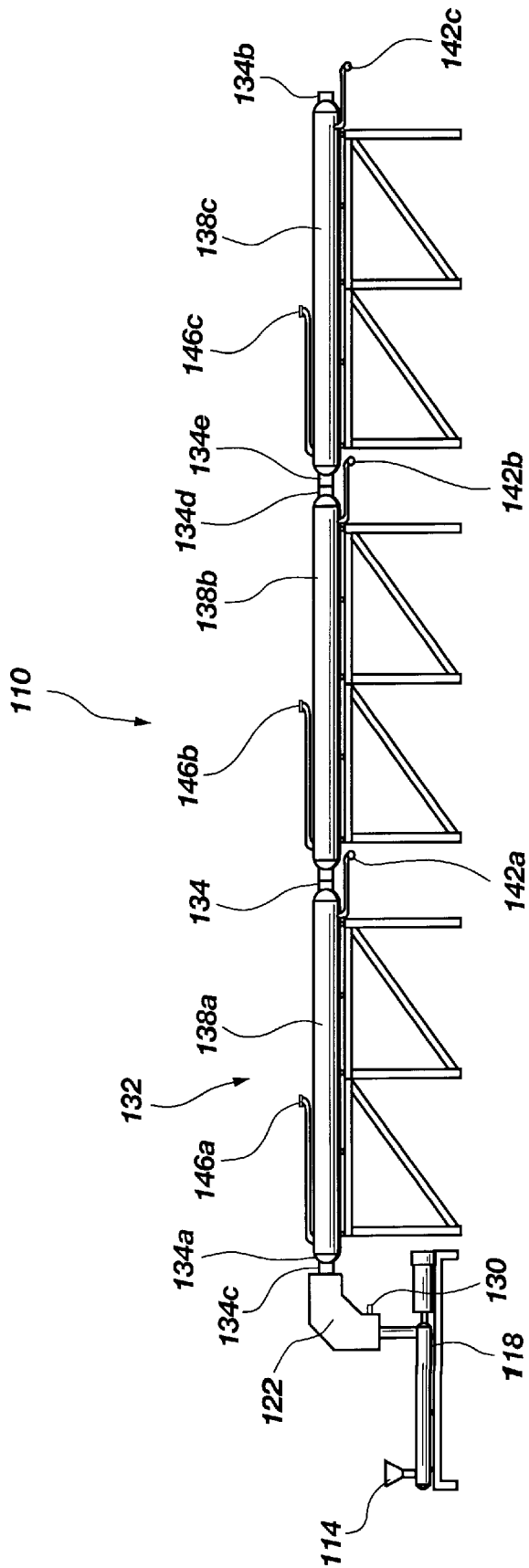
FIG. 2 shows a side view of another embodiment of a continuous cheese molding, chilling and cutting apparatus utilizing principles of the present invention of the present invention.

Referring now to FIG. 2, there is shown another embodiment of a continuous molding, chilling and cutting apparatus utilizing principles of the present invention. The continuous molding, chilling and cutting apparatus is generally indicated at 110. The apparatus 110 includes an inlet 114, and a movement means 118 in the form of a pump for forcing the cheese curds through the apparatus. The movement means 118 typically passes the warm cheese though an expansion chamber (not shown) disposed within an expansion housing 122 to remove any excess air which might cause mechanical separation in the curds as they are formed into blocks. A coolant supply line 130 may be disposed in communication with the expansion housing 122 to precool the cheese before it is passed into a molding/chilling means 132. It is important to note that the expansion chamber may be omitted while still obtaining satisfactory results. However, the omission of such tends to increase the incidence of mechanical separation.

The molding/chilling means 132 includes an elongate molding tube 134 having an inlet end 134a for receiving cheese and an outlet end 134b through which the solidified block of cheese is passed. As shown in FIG. 2, the molding tube 134 is divided into three sections 134c, 134d and 134e. Each of the three sections has a sleeve or jacket tube 138a, 138b and 138c, respectively, disposed thereabout. Each jacket tube 138a–c is disposed in communication with a coolant supply line 142a, 142b and 142c, respectively. The supply line 142a–c supplies a coolant to the jacket tube from the respective jacket tube 138a–c to cool the section of the molding tube 134 about which the jacket tube is placed. Each jacket tube 138*a–c* also has a coolant return line 146*a*, 146*b* and 146*c*, respectively, for returning the coolant to a compressor or other heat exchange mechanism.

In such a manner, the coolant supply lines 142*a–c*, return lines 146*a–c* and the jacket tubes 138*a–c*, form a means for producing a three tiered cooling gradient. The temperature in each of the tiers, i.e. each jacket tube 138*a–c*, can be independently controlled so as to properly chill the cheese without freezing the cheese in the molding tube 134, or otherwise negatively impacting the cheese. If the temperature drop of the cheese at the end of either the first or second sections 134*c* and 134*d* is too high or too low, the coolant supplied to the subsequent section(s) may be adjusted to achieve a solidified cheese out the opposing end having the desired temperature for cutting. To monitor the progress of the cheese, one of more temperature sensors (FIG. 3) may be disposed along the molding tube—typically at the end of each section.

The three tier temperature gradient is important to chill the cheese sufficiently while compensating for thermal conductivity in the cheese. For example, mozzarella is typically extruded at about 140 degrees F. Because it is a soft cheese, the desired temperature for cutting is between 40 and 50 degrees F. If the mozzarella were passed through a chilled tube, the outer portion of the cheese would quickly solidify, while the center of the cheese mass would still be flowable. The solidified exterior of the cheese would significantly hamper flowability, but the cheese could not be cut properly until the center portion had solidified.

In accordance with the present invention, it has been found that the cooling of mozzarella is preferably done in a three step process. First, the cheese is cooled from an initial temperature (or a temperature slightly below the extrusion temperature) to a first reduced temperature. Typically, the temperature drop will be from approximately 140 degrees F to approximately 120 degrees F. The cheese must then be cooled to a second reduced temperature of approximately 80 degrees F. Finally, the cheese must be reduced to a third reduced temperature of between about 40 and 50 degrees F. At the third reduced temperature, the mozzarella is ready for cutting.

Utilizing the apparatus 110 shown in FIG. 2, such processing of the mozzarella is relatively easy. The coolant supplied via the coolant supply line 142*a* in communication with the jacket tube 138*a* about the first section 134*c* of the molding tube is sufficiently cold to lower the temperature of the cheese to approximately 120 degrees F by the time that the cheese reaches the end of the first section, but not cold enough to solidify the exterior portion of the cheese. While numerous coolants may be used, using glycol at approximately 22 degrees F works. Of course, as will be apparent from the discussion above, the position of the coolant supply line 142*a* and the coolant return line 146*a* can be used to effect a cooling gradient within the first section 134*c* of the molding tube 134, the coolant being colder adjacent the distal end of the section, and warming as it moves to the proximal end and into the coolant return line 146*a*.

As the cheese moves into the second section 134*d* of the molding tube 134, the temperature of the cheese is further reduced by the coolant which is supplied via the coolant supply line 142*b* and released out the coolant return line 146*b*. Typically the coolant supplied into the jacket tube 138*b* of the second section 134*d* is colder than that supplied to the first section 134*c*, e.g. 15–18 degrees F. The coolant cools the cheese from approximately 120 degrees F to approximately 80 degrees F. One primarily advantage of having independent coolant supply lines and coolant return lines 142*a* and 146*b* is that the operator can more closely control the cooling which occurs within the second section 134*d* regardless of what temperatures are used in the first section 134*c*. If the cheese received from the first section 134*c* is too hot, the temperature of the coolant can be decreased to gradually bring the temperature of the cheese down to the desired temperature for the second section. Likewise, if the temperature of the cheese received from the first section 134*c* is too low, the temperature of the coolant can be increased to bring the cooling curve into conformity with that desired.

The cheese passing out the second section 134*d* of the molding tube 134 is preferably about 80 degrees F and will be chilled another 30 to 40 degrees in the third section. It should be understood that there is no mechanical separation between the cheese disposed at the inlet end 134*a* and cheese passing out of the outlet end 134*b* at the opposite end of the molding tube 134. Rather, the cheese in the molding tube 134 is one large piece of cheese, with different portions of the piece being in different stages of solidification. By the time the cheese reaches the outlet end 134*b* of the molding tube 134, however, it is ready to be cut into blocks of the desired size and further processed or packaged for shipping.

While discussed in respect to FIG. 2 as a three tiered cooling gradient, any number of tiers may be used. However, it is believed that at least two tiers is preferable because of the independent control which is provided by independent coolant supply and return lines. Those skilled in the art, however, will appreciate numerous other means for achieving the same type of controlled temperature drop in the cheese as it is moved from the inlet end 134*a* to the outlet end 134*b* in light of the present disclosure.

Another significant advantage of the present invention is that it can be quickly and easily cleaned in place. When cleaning is indicated, water or some other medium is fed into the inlet 114 and is forced by the movement means 118 through the expansion chamber and into the molding tube 134. The water applies force to the cheese and keeps the cheese moving through the system. While the water will generally render the last three to five inches of the cheese unusable, the loss is minimal and far less than that of many of the prior attempts to automate cheese production.

Once the cheese is cleared from the molding tube 134, a cleaning solution may either be forced through the molding tube 134 via the inlet 114, pump and expansion chamber, or a rod with a plurality of nozzles may be inserted into the molding tube so as to soak the interior wall of the molding tube with the cleaning solution. The molding tube 134 and any other portions of the apparatus 110 exposed to the cleaning solution may then be rinsed and cheese molding, chilling and cutting may resume. Such an efficient method of cleaning significantly reduces down time and costs associated with cleaning.

Figure 3:
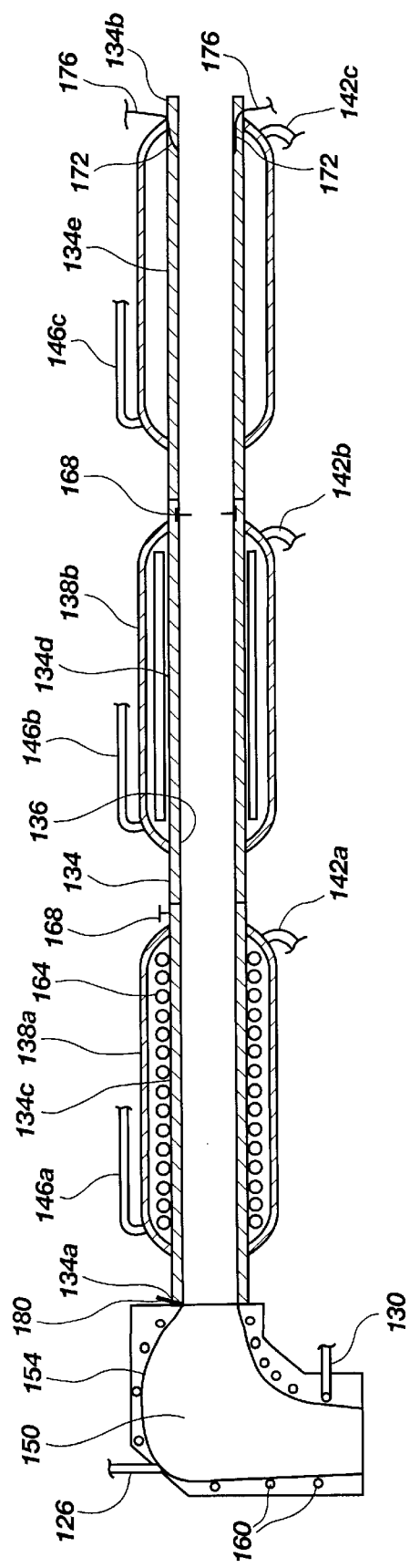
FIG. 3 shows a cross-sectional view of the expansion housing and molding/chilling means of the continuous cheese molding, chilling and cutting apparatus shown in FIG. 2.

Referring now to FIG. 3, there is shown a cross-sectional view of the expansion housing 122 and the molding/chilling means 132 of FIG. 2. Disposed inside the expansion housing 122 is an expansion chamber 150 defined by an inner wall 154. As cheese passes through the expansion chamber 150, any excess air is drawn off by the vacuum 126 as was discussed above. To help cool the cheese, a cooling coil 160 or some similar cooling mechanism utilizes coolant supplied by coolant supply line 130. The temperature drop of the cheese while within the expansion chamber will typically be about 1–5 degrees.

From the expansion chamber 150, the cheese is forced into the inlet end 134a of the elongate molding tube 134. As the cheese passes through the first section 134c of the molding tube 134, the temperature of the cheese will drop. The extent of the temperature drop will depend on the type of cheese, the coolant temperature and the configuration of the cooling coils, etc. For example, in the first jacket tube 138a, the coolant received from the coolant supply line 142a is passed through a helically wound coil 164 before exiting out the coolant return line 146a. In such a manner, the temperature differential between the incoming coolant and the outgoing coolant is maximized. The helical coil maximizes the distance that the coolant must travel between the supply line 142a and the return line 146a, thereby maximizing the heat transfer.

Regardless of what coolant flow configuration is provided, it is desirable that the cheese have a very small temperature differentiation between the cheese disposed adjacent to the inner wall 136 of the molding tube 134 and the cheese in the middle thereof.

As the cheese passes into the second section 134d of the molding tube 134, it passes by a sensor 168 which measures the temperature of the cheese. If the cheese is not a desired temperature for entering the second section 134d, the coolant flow into the second jacket tube 138b via the coolant supply line 142b is adjusted to compensate for the temperature disparity. Adjustment may include altering the flow rate of the coolant, or adjusting the coolant's temperature.

As shown in FIG. 3, the second jacket tube utilizes a plurality of straight coolant flow tubes 172 to cool the second section 134d of the molding tube 134. Such a configuration is shown as an example of what may be used and is not intended to limit the configurations of the molding/chilling means 132.

Likewise, the jacket tube 138c disposed about the molding tube 134 shows a chamber which may be simply flooded with a coolant. Due to inflow through the coolant supply line 142c, warmed coolant is forced out through the coolant return line 146c.

Also shown in FIG. 3 is an invasive sensor 168. Such a sensor 168 can be used for monitoring temperature within the cheese, or for analyzing pH, etc. Because the cheese will still typically be relatively elastic at the end of the second section 134d, the cheese can fill in any marks left by the sensor. Of course, the molding tube could have a plurality of sensors disposed along it to monitor the progress of the cheese at numerous locations.

Downstream from the sensor 168 are a plurality of ports 172. The ports 172 are connected to warm water supply lines 176. The warm water supplied through the ports acts as a heating mechanism. The warm water is just warm enough to soften the outermost layer of the cheese. The warmed outer layer enables the fat contained therein to lubricate the cheese as it slides through the molding tube 134. Typically, such heating mechanisms will only be used adjacent the outlet end 134b of the molding tube 134 where the cheese has substantially solidified. In addition to improving the slidability, the warm water also helps the cheese to form a shiny coating along its exterior. Those skilled in the art will appreciate that other heating mechanisms, such as one or more wires, could be used to accomplish the same result.

One anticipated aspect of the invention is to provide a lever 180 or other mechanism which can be released to enable the molding tube 134 to be detached from the expansion housing 122. In such a configuration, the molding tube 134 can be withdrawn from the jacket tubes and one of a different cross-sectional shape inserted therein. Of course, in such a configuration, the coolant mechanisms must be adapted to the shape of the molding tube as could be done by using a second heat transfer medium such as water within the jacket tubes. In the alternative, the molding tube could have a consistent exterior shape so that the wall defining the molding tube is not of consistent thickness.

While the use of glycol, as described above, works for the forming of cheese blocks, certain concerns have been raised by the rapid cooling of the cheese curds by the glycol. More specifically, the rapid cooling caused by the cold glycol tends to cause butter fat to solidify on the exterior of the cheese. Thus, when the cheese is released from the end of the tube, splotches of butter fat are often present. These splotches leave the cheese looking unattractive and of questionable marketability.

In an improvement to the method discussed above, it has been found that the use of different cooling media can provide superior results by more gradually reducing the temperature. For example, culinary water (typically between about 65 and 80 degrees Fahrenheit) can be used in the first section, chilled water (typically between 32 and 50 degrees Fahrenheit) can be used in the second section, and glycol (typically between 18 and 22 degrees Fahrenheit) can be used in the third section. The use of the three different cooling media brings the temperature of the cheese down more slowly and has been found to virtually eliminate the problem of butter fat solidification on the cheese.

Figure 4:
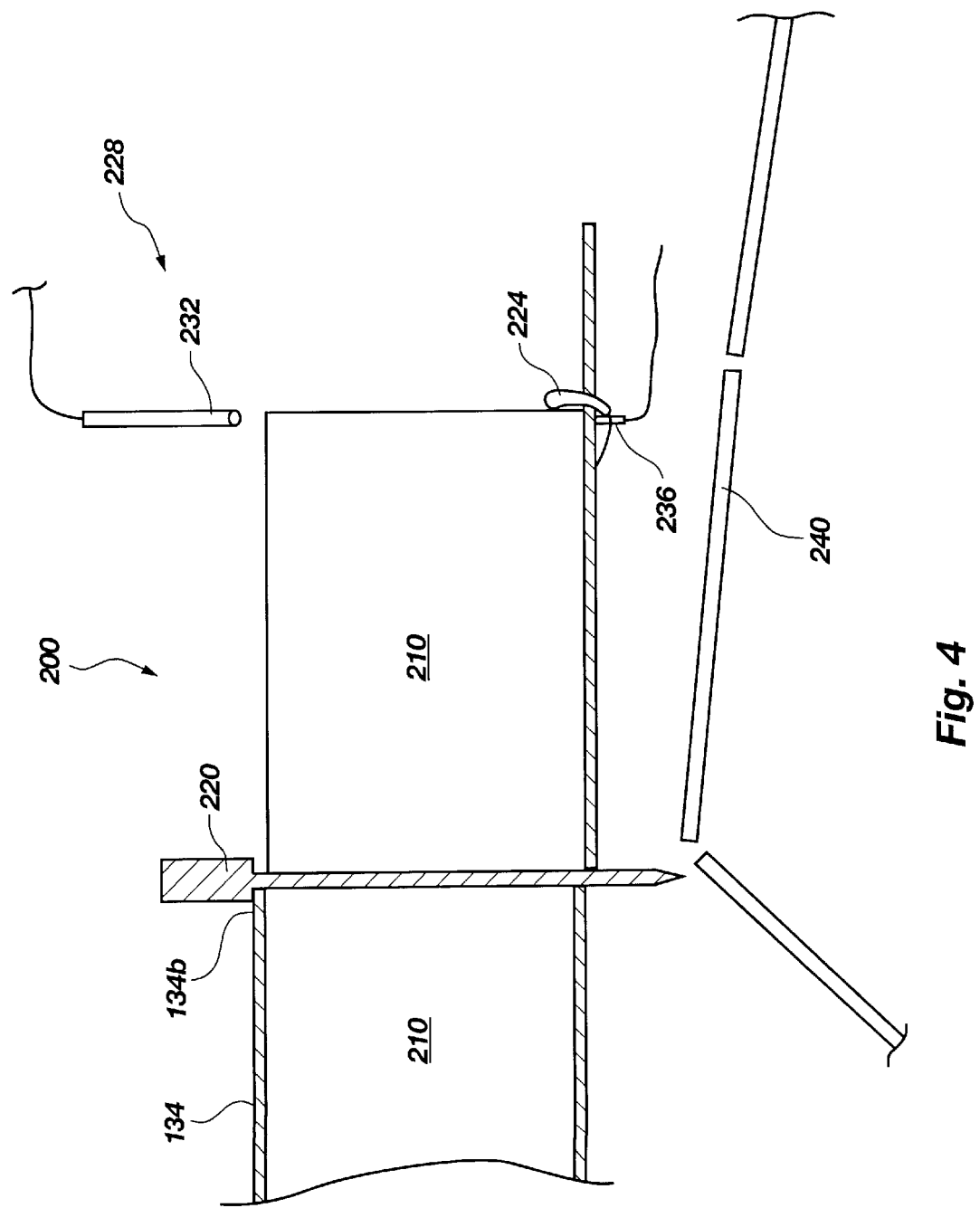
FIG. 4 shows a close-up, cross-sectional view of the end of an elongate molding tube and a cheese cutting mechanism disposed adjacent thereto as may be used in accordance with the principles of the present invention.

Referring now to FIG. 4, there is shown a close-up view of the outlet end 134b of the molding tube 134, as well as a measuring and cutting apparatus, generally indicated at 200. As the cheese 210 passes out of the outlet end 134b of the molding tube 134, it is cut so that blocks of cheese having a desired weight are produced. Because the cross-sectional area of the cheese will remain the same as long as the same molding tube 134 is being used, the only factor which must be accounted for in cutting the cheese is the length of the block.

In light of the present disclosure, those skilled in the art will appreciate that there are mechanisms for actuating a cutting blade 220 when the desired length is achieved. This may include a switch 224 which is moved by the cheese when the cheese reaches the desired length. In such an arrangement, the position of the switch 224 could be moved to enable cutting of different sized blocks of cheese. For example, one run could cut five pound blocks, followed by another run which would cut one pound blocks for immediate packaging.

An alternative method for determining when to actuate the cutting blade 220 is to provide an optical sensor 228. Such a sensor typically include a light emitting source 232, and a light sensor 236. If a beam of light does not reach the light sensor 236 after being emitted by the light emitting source 232, the cutting blade 220 is actuated to cut the cheese. Depending on how frequently the light is emitted, a high degree of accuracy can be achieved.

Once the cheese 210 is cut into the desired sized block, the block of cheese is dropped or otherwise passed onto a conveyer belt 240 or some similar transport mechanism and forwarded for aging or packaging. In such a manner, the cheese 210 can travel from the extruder to packaging without ever being touched by a person, and with minimal exposure to air. This, in turn, decreases the risk of the cheese being contaminated by bacteria or other microorganisms.

While there are numerous different ways of implementing the method of the present invention, it is of critical importance that the cheese be kept under pressure, and that the cheese be chilled in such a manner to prevent drastic differences between the exterior and interior of the cheese. To accomplish this, the present invention utilizes an elongate molding tube to maintain the pressure on the cheese and thereby form a block.

As the cheese is forced through the molding means, the cheese is exposed to at least one cooling gradient wherein temperature of the coolant is greater adjacent to the inlet end than at the opposing outlet end. Preferably, the cooling gradient is configured such that there are at least two distinct cooling sections, the first section lowering the temperature from an initial temperature to a first reduced temperature, and a second section lowering the temperature of the cheese from the first reduced temperature to a second reduced temperature. With many types of cheese, especially soft cheeses, the cheese will pass through a third section to further reduce the temperature to a third reduced temperature at which the cheese is ready for cutting.

Throughout the molding means, the temperature of the cheese is carefully controlled to prevent over solidification of the exterior portion of the cheese. Such may be accomplished by regulating coolant temperature, and by providing a heating source, such as warm water, when necessary to maintain the desired movement of the cheese.

One significant advantage of the present invention is that a brine bath is not used to cool the cheese, even for mozzarella. By omitting the brine solution, considerable costs and environmental harms are avoided, and the cheese product may be more rapidly formed into blocks of cheese having a desired weight and temperature.

Turning now to FIG. 5, there is shown a cross-sectional view of an apparatus for continuous molding/chilling/cutting of cheese, generally indicated at 300. The apparatus 300 includes an inlet 304 into which cheese curds are disposed, and a pump 308 adjacent the inlet which forces the cheese through the apparatus. From the pump 308, the cheese is moved into a pre-heat/back pressure vessel 312. While the embodiments previously discussed work, it has been found that there remains some concern with continued mechanical separation. In other words, the individual cheese curds are not fused together properly when the block of cheese exits the apparatus. It has been found that by reheating the cheese shortly before it is cooled, a substantial decrease in mechanical separation can be achieved.

To reheat the cheese, the preheat/back pressure vessel 312 has a first, fluid in port 316 and a second, fluid out port 318 which are disposed in fluid communication with a jacket 320 (FIG. 5A) which surrounds a cheese flow tube 324 (FIG. 5A). A heating fluid is pumped through the pre-heat/back pressure vessel 312, to warm the cheese before it is molded. The heating fluid is preferably water heated to between 150 and 200 degrees Fahrenheit.

The cheese moving through the pre-heat/back pressure vessel 312 preferably travels uphill between the inlet and outlet of the pre-heat/back pressure vessel as is shown at 328 in FIG. 5A. Additionally, the cheese is forced through a constriction section 332, i.e. having a narrowed diameter smaller than upstream portions of the vessel, prior to entering into the molding tube 336 of the apparatus 300. The uphill movement and the constriction section 332 each create back pressure on the hot cheese. The back pressure and the heat, in turn, promote fusing of the cheese curds as the cheese is forced into the front end 336a of the molding tube 336 of the apparatus. By the time the cheese arrives at the opposing end 336b of the molding tube 336, the cheese has formed a solid block having minimal mechanical separation. The decrease in mechanical separation which begins in the pre-heat/back pressure vessel 312 also improves movement of the cheese through the first, second and third sections 336c, 336d and 336e of the molding tube 336. While shown as a three section tube, those skilled in the art will appreciate that a single tube can be used, or any other configuration which molds and chills the cheese as it moves.

While the prior embodiments have cooled the cheese prior to introduction into the molding tube (i.e. FIG. 3), the heating of the cheese provides a block of cheese which is aesthetically much more pleasing. Additionally, use of the pre-heat/back pressure vessel 312 and differing cooling media to more gradually reduce the temperature have been found to virtually eliminate the problem of butter fat solids forming on the exterior of the cheese. Thus, not only is mechanical separation improved, aesthetics of the resulting cheese product is improved as well.

Figure 6:
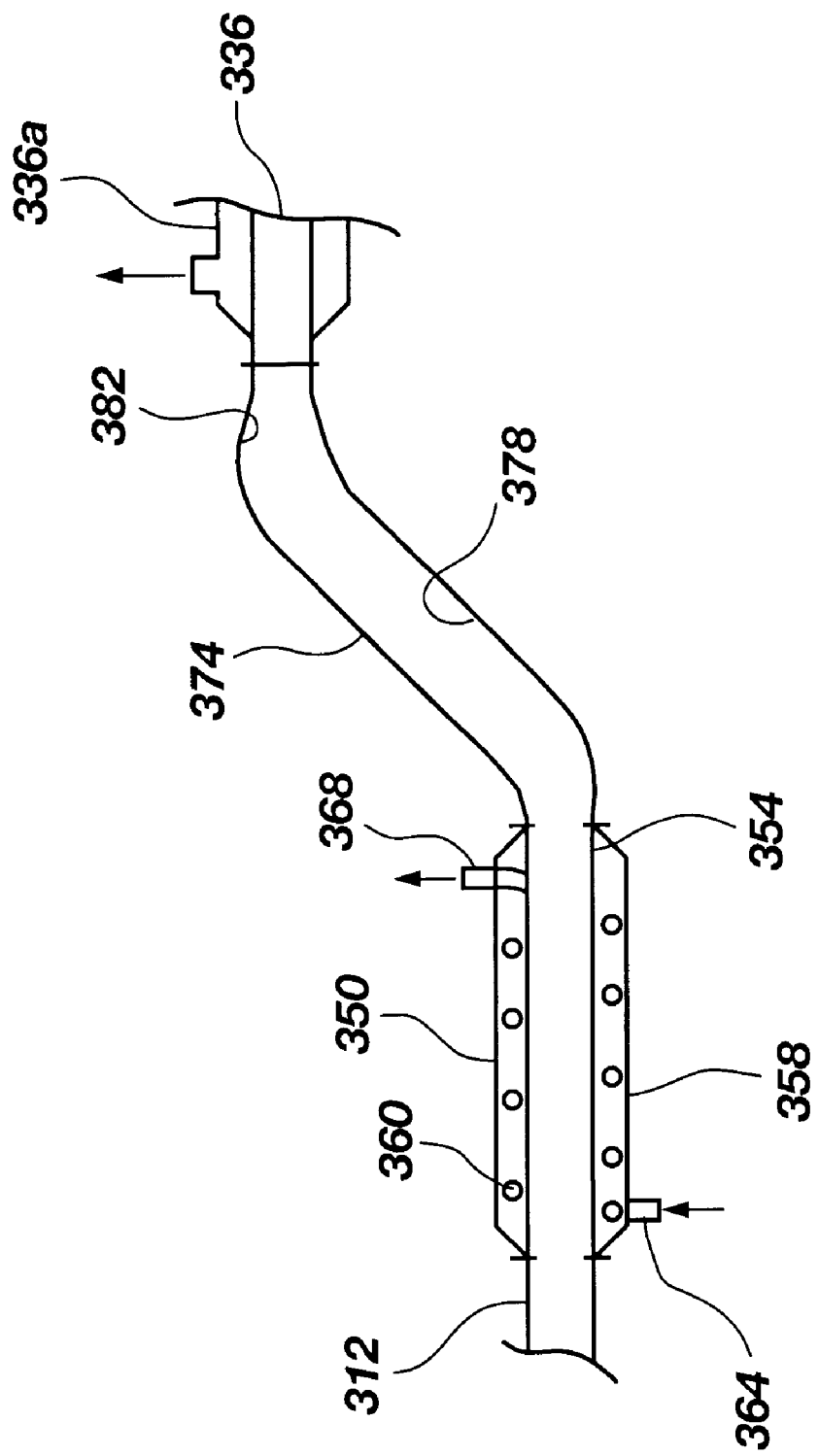
FIG. 6 shows a cross-sectional view of yet another embodiment of the present invention.

Turning now to FIG. 6, there is shown a close-up, cross-sectional view of an alternate embodiment by which the mechanical separation of the cheese can be reduced. Rather than providing a single pre-heat and back pressure vessel as in FIGS. 5 and 5A, the embodiment in FIG. 6 utilizes two distinct portions. From the pump 312 the cheese is first passed through a pre-heat vessel 350. The pre-heat vessel 350 has a central tube 354 through which cheese flows, and an outer jacket 358 which is disposed coaxially with the central tube.

A heating coil 360 is disposed between the jacket 358 and the central tube 354, to heat the central tube and the cheese contained therein. Preferably, hot water (i.e. between 150 and 200 degrees Fahrenheit) is used as the heating medium. However, the coil 360 could utilize another liquid, or could be electrical in nature. If water is used, an inlet portion 364 will typically be disposed adjacent the pump 312 and an outlet portion 368 will be disposed on an opposing end.

From the pre-heat vessel, the cheese is moved into a back pressure vessel 374. The back pressure vessel 374 preferably provides an uphill movement path for the cheese to develop back pressure. Additionally, a constriction portion 382 is provided to supply additional pressure to the cheese curds and reduce the amount of mechanical separation.

While a back pressure vessel 374 and a constriction portion 382 are preferred, either one may be used to develop sufficient pressure on the cheese curds to reduce mechanical separation. This is especially true when using the Marlen pump. The pump generates considerable force, without a tendency to cut the cheese curds into ribbons, as is common with the MYONO pump. Furthermore, the use of the Marlen pump, the back pressure vessel 374 and the constriction portion 382 removes the need for the expansion chamber.

Thus there is disclosed an apparatus and method for the continuous molding, chilling and cutting of cheese. Those skilled in the art will appreciate that numerous modifications may be made without departing from the scope and spirit of the present invention. The appended claims are intended to cover such modifications.

What is claimed is:

1. An apparatus for the continued molding and chilling of cheese the apparatus comprising:
   molding means having an elongate molding tube configured for forming flowable cheese into a desired shape, the molding tube having an inlet end and an outlet end;
   pump means disposed adjacent the molding means for forcibly moving cheese into the inlet end, through the molding tube and out the outlet end; and cooling means disposed in communication with the molding means adjacent the inlet end for cooling the molding tube to thereby chill cheese as the cheese moves through the molding tube, the cooling means comprising means for developing a coolant gradient along the molding tube so that the molding tube adjacent the outlet end is colder than the molding tube adjacent the inlet end to form solidified cheese.

2. The apparatus of claim 1, wherein the apparatus further comprises an expansion chamber for reducing mechanical separation of the cheese disposed distally of the pump means and adjacent the inlet end and disposed in communication therewith such that cheese passes through the expansion chamber prior to entry into the inlet end of the molding tube.

3. The apparatus of claim 1, wherein the apparatus further comprises an expansion chamber disposed adjacent the inlet end and means for cooling the expansion chamber so as to cool cheese passing through the expansion chamber.

4. The apparatus of claim 1, wherein the coolant means comprises a jacket tube disposed about the molding tube, the jacket tube having a coolant supply line and a coolant return line attached thereto.

5. The apparatus of claim 1, wherein the apparatus further comprises heating means disposed between the pump means and the molding means for heating flowable cheese prior to movement through the molding means.

6. The apparatus of claim 5, wherein the heating means comprises a pre-heating vessel disposed adjacent to the pump means for heating flowable cheese.

7. The apparatus of claim 1, wherein the apparatus further comprises a means for generating back pressure, said means for generating back pressure being disposed between the pump means and the molding means.

8. The apparatus of claim 7, wherein the means for generating back pressure comprises a vessel having an inlet and an outlet and a vertical rise between the inlet to the outlet, said vertical rise being sufficient to create back pressure on flowable cheese moving from the inlet to the outlet.

9. The apparatus of claim 7, wherein the means for generating back pressure comprises a vessel, said vessel having a constricted portion with a narrowed diameter configured for constricting flowable cheese flowing through said vessel.

10. The apparatus of claim 1, wherein the apparatus further comprises at least one temperature sensing means disposed within the molding tube for monitoring temperature of the cheese passing by said temperature sensing means.

11. An apparatus for the continued molding and chilling of cheese the apparatus comprising:
molding means having an elongate molding tube for forming flowable cheese into a desired shape, the molding tube having an inlet end and an outlet end;
pump means disposed adjacent the molding means for forcibly moving cheese into the inlet end, through the molding tube and out the outlet end; and
cooling means disposed in communication with the molding means for cooling the molding tube to thereby chill cheese as the cheese moves through the molding tube, the cooling means comprising means for developing a coolant gradient along the molding tube so that the molding tube adjacent the outlet end is colder than the molding tube adjacent the inlet end; and
a pre-heating vessel disposed adjacent to the pump means for heating flowable cheese, said pre-heating vessel comprising a back pressure generating mechanism for developing back pressure in the flowable cheese.

12. The apparatus of claim 11, wherein the back pressure generating mechanism comprises an uphill slope disposed such that the cheese must travel uphill after exiting the pump means and before entering the molding means.

13. The apparatus of claim 11, wherein the back pressure generating mechanism comprises a constricting portion having a narrowed diameter for constricting flowable cheese passing through the pre-heating vessel.

14. An apparatus for the continued molding and chilling of cheese the apparatus comprising:
a pump means for receiving cheese curds and for forcibly moving cheese curds through a molding/chilling tube;
pre-heating means disposed adjacent to the pump means for receiving cheese curds moved by the pump means for heating cheese curds to thereby discourage mechanical separation during molding thereof; and
at least one molding/chilling tube configured for forming cheese curds into cheese of a desired shape, the molding/chilling tube having an elongate molding tube with an inlet end and outlet end, the elongate molding tube being configured for forming cheese curds into the desired shape; and cooling means disposed in communication with the molding tube for cooling the molding tube; and
means for generating a back pressure on the cheese curds prior to molding into the desired shape.

15. The apparatus according to claim 14, wherein the cooling means further comprises means for developing a cooling gradient along the molding tube so that the molding tube adjacent the outlet end is colder than the molding tube adjacent the inlet end.

16. The apparatus according to claim 14, wherein the pre-heating means comprises a vessel having a tube for receiving cheese curds from the pump and a heating means for heating said tube.

17. The apparatus according to claim 14, wherein the means for generating a back pressure within cheese curds in the apparatus is disposed adjacent the inlet end to thereby encourage bonding of the cheese curds.

18. The apparatus according to claim 17, wherein the means for generating a back pressure with cheese curds comprises a vessel having an inlet and an outlet and a vertical rise between the inlet and the outlet to thereby create back pressure in cheese curds passing through the vessel as the cheese curds move up the vertical rise.

19. The apparatus according to claim 17, wherein the means for developing a back pressure comprises a constricting portion disposed in the vessel, said constricting portion having a narrowing diameter to develop back pressure as cheese curds are forced therethrough.

20. A method of continuous molding cheese wherein the method comprises:
providing an elongate molding tube with an inlet end and an outlet end for molding the cheese into a desired shape;
selectively cooling the molding tube so as to develop a cooling gradient along the molding tube with the outlet end of the molding tube being cooler than the inlet end of the molding tube; and
forcibly moving cheese through the molding tube at an effective rate to achieve a gradual cooling of the cheese while maintaining slidability of the cheese within the molding tube.

21. The method of claim 20, wherein the method further comprises passing the cheese through an expansion chamber prior to entry into the molding tube so as to release air trapped within the cheese.

22. The method according to claim 20, wherein the method further comprises monitoring the temperature of the cheese as it moves through the molding tube.

23. A method of continuous molding and chilling of cheese wherein the method comprises:

providing an elongate molding tube with an inlet end and an outlet end for molding the cheese into a desired shape;

selectively cooling the molding tube so as to develop a cooling gradient along the molding tube with the outlet end of the molding tube being cooler than the inlet end of the molding tube; and forcibly moving cheese through the molding tube at an effective rate to achieve a gradual cooling of the cheese while maintaining slidability of the cheese within the molding tube; and wherein the method further comprises passing the cheese through a heating mechanism to decrease mechanical separation in the cheese.

24. The method according to claim 23, wherein the method comprises passing the cheese through a pump for forcibly move the cheese and reheating the cheese after it has been passed through the pump.

25. The method according to claim 23, wherein the method comprises heating the cheese to between 150 and 200 degrees Fahrenheit prior to molding and chilling the cheese.

26. A method of continuous molding and chilling of cheese wherein the method comprises:

providing an elongate molding tube with an inlet end and an outlet end for molding the cheese into a desired shape;

selectively cooling the molding tube so as to develop a cooling gradient along the molding tube with the outlet end of the molding tube being cooler than the inlet end of the molding tube; and forcibly moving cheese through the molding tube at an effective rate to achieve a gradual cooling of the cheese while maintaining slidability of the cheese within the molding tube; and wherein the method comprises creating a back pressure in cheese prior to movement of the cheese through the molding tube.

27. The method according to claim 26, wherein the method comprises forcing the cheese up a vertical rise prior to movement of the cheese through the molding tube.

28. The method according to claim 26, wherein the method comprises passing the cheese up a vertical rise prior to movement of the cheese through the molding tube.

* * * * *